(12) United States Patent
Sibley et al.

(10) Patent No.: US 7,302,224 B2
(45) Date of Patent: Nov. 27, 2007

(54) COMMUNICATION SYSTEM FOR REBROADCASTING ELECTRONIC CONTENT WITHIN LOCAL AREA NETWORK

(75) Inventors: Erin H. Sibley, Los Angeles, CA (US); Michael W. Sales, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 646 days.

(21) Appl. No.: 09/844,920

(22) Filed: Apr. 26, 2001

(65) Prior Publication Data

US 2001/0039180 A1 Nov. 8, 2001

Related U.S. Application Data

(63) Continuation-in-part of application No. 09/564,082, filed on May 3, 2000.

(60) Provisional application No. 60/249,153, filed on Nov. 16, 2000, provisional application No. 60/262,811, filed on Jan. 19, 2001, provisional application No. 60/268,482, filed on Feb. 12, 2001, provisional application No. 60/271,578, filed on Feb. 22, 2001, provisional application No. 60/272,741, filed on Mar. 1, 2001.

(51) Int. Cl.
*H04H 1/00* (2006.01)
*H04B 7/00* (2006.01)
*H04Q 7/22* (2006.01)

(52) U.S. Cl. .................. 455/3.02; 455/41.2; 455/414.1; 725/63; 725/110

(58) Field of Classification Search .............. 455/3.01, 455/3.02, 3.04, 3.05, 3.06, 414.1, 463, 41.2, 455/561; 725/63–68, 74, 78, 81–83, 110, 725/114, 117, 139; 348/14.02, 14.04, 197, 348/474

See application file for complete search history.

(56) References Cited

U.S. PATENT DOCUMENTS

| | | | |
|---|---|---|---|
| 5,423,059 A | | 6/1995 | LoGalbo et al. |
| 5,584,047 A | | 12/1996 | Tuck |
| 5,586,121 A | | 12/1996 | Moura et al. |
| 5,625,864 A | * | 4/1997 | Budow et al. ............... 455/4.2 |
| 5,659,350 A | * | 8/1997 | Hendricks et al. ........... 455/3.1 |
| 5,682,195 A | * | 10/1997 | Hendricks et al. ........... 455/5.1 |
| 5,684,799 A | * | 11/1997 | Bigham et al. .............. 455/5.1 |
| 5,708,961 A | * | 1/1998 | Hylton et al. .................. 348/7 |

(Continued)

OTHER PUBLICATIONS

Hadjitheodosiou, M.H., Ephremides, A., Friedman, D.; Technical Research Report; "Broadband Access via Satellite"; CSHCN T.R. 99-2 (ISR T.R. 99-9); www.isr.umd.edu/CSHCN/.

(Continued)

*Primary Examiner*—Tony T. Nguyen

(57) ABSTRACT

A system of distributing electronic content has a network operations center generating a broadcast signal having digital electronic content. A communication backbone is coupled to the network operations center. A base station receives the broadcast signal from the backbone. The base station receives the broadcast signal and forms a wireless local area network. The base station rebroadcasts at least a portion of the broadcast signal as a rebroadcast signal using the wireless local network. A user appliance is positioned with said local area network and receives the rebroadcast signal.

19 Claims, 2 Drawing Sheets

U.S. PATENT DOCUMENTS

| | | | |
|---|---|---|---|
| 5,717,737 | A | 2/1998 | Doviak et al. |
| 5,727,065 | A | 3/1998 | Dillon |
| 5,729,279 | A * | 3/1998 | Fuller .......................... 348/8 |
| 5,760,848 | A | 6/1998 | Cho |
| 5,764,188 | A | 6/1998 | Ghosh et al. |
| 5,790,935 | A | 8/1998 | Payton ....................... 455/5.1 |
| 5,835,128 | A | 11/1998 | Macdonald et al. |
| 5,852,721 | A | 12/1998 | Dillon et al. |
| 5,864,579 | A | 1/1999 | Briskman |
| 5,867,109 | A | 2/1999 | Wiedeman |
| 5,915,207 | A | 6/1999 | Dao et al. |
| 5,918,157 | A | 6/1999 | Wiedeman et al. |
| 5,937,332 | A | 8/1999 | Karabinis |
| 5,949,498 | A | 9/1999 | Rudolph |
| 5,949,766 | A | 9/1999 | Ibanez-Meier et al. |
| 5,970,386 | A | 10/1999 | Williams |
| 5,990,927 | A | 11/1999 | Hendricks et al. |
| 5,990,928 | A | 11/1999 | Sklar et al. |
| 5,995,725 | A | 11/1999 | Dillon |
| 5,995,726 | A | 11/1999 | Dillon |
| 6,016,388 | A | 1/2000 | Dillon |
| 6,097,441 | A | 8/2000 | Allport |
| 6,100,853 | A | 8/2000 | Schaffner et al. |
| 6,118,824 | A | 9/2000 | Smith et al. |
| 6,119,016 | A | 9/2000 | Matusevich |
| 6,151,308 | A | 11/2000 | Ibanez-Meier et al. |
| 6,160,989 | A | 12/2000 | Hendricks et al. |
| 6,161,141 | A | 12/2000 | Dillon |
| 6,198,920 | B1 | 3/2001 | Doviak et al. |
| 6,268,781 | B1 | 7/2001 | Schaffner |
| 6,301,463 | B1 | 10/2001 | Dao et al. |
| 6,337,911 | B1 | 1/2002 | Dillon |
| 6,338,131 | B1 | 1/2002 | Dillon |
| 6,374,080 | B2 | 4/2002 | Uchida |
| 6,381,747 | B1 * | 4/2002 | Wonfor et al. .............. 725/104 |
| 6,385,434 | B1 | 5/2002 | Chuprun et al. |
| 6,430,233 | B1 * | 8/2002 | Dillon et al. ................. 725/68 |
| 6,452,640 | B1 | 9/2002 | Yuen et al. |
| 6,493,873 | B1 | 12/2002 | Williams |
| 6,526,575 | B1 | 2/2003 | McCoy et al. |
| 6,529,742 | B1 | 3/2003 | Yang |
| 6,543,050 | B1 * | 4/2003 | Letellier et al. .............. 725/31 |
| 6,556,248 | B1 | 4/2003 | Kim |
| 6,661,472 | B2 | 12/2003 | Shintani et al. |
| 6,675,388 | B1 | 1/2004 | Beckmann et al. |
| 6,681,259 | B1 | 1/2004 | Lemilainen et al. |
| 6,711,379 | B1 | 3/2004 | Owa et al. |
| 6,958,987 | B1 * | 10/2005 | Herring et al. ............. 370/338 |
| 2002/0073437 | A1 | 6/2002 | Chang et al. |
| 2003/0105845 | A1 | 6/2003 | Leermakers |
| 2005/0028208 | A1 | 2/2005 | Ellis et al. |

OTHER PUBLICATIONS

Glenn, Robert et al.; Draft Wireless White Paper; "Wireless Information Technology for 21st Century"; Information Technology Laboratory NIST; Feb. 17, 1999; pp. 14-17.

Forrest, John R.; "Communication Networks for the New Millennium"; IEEE Transactions on Microwave Theory and Techniques, vol. 47, No. 12, Dec. 1999.

Bern, Daniel J. et al.; "Broadband Satellite Systems"; IEEE Communications Survey & Tutorials; 1st Quarter 2000; vol. 3, No. 1; www.comsoc.org/pubs/surveys.

* cited by examiner

COMMUNICATION SYSTEM FOR REBROADCASTING ELECTRONIC CONTENT WITHIN LOCAL AREA NETWORK

RELATED APPLICATIONS

The present application is a continuation-in-part of Ser. No. 09/564,082 filed on May 3, 2000. The present application claims priority to provisional applications each of which are incorporated by reference herein as follows: Ser. Nos. 60/249,153 filed on Nov. 16, 2000, entitled "Mobile Multimedia Subscription Programming Delivery System"; Ser. No. 60/262,811 filed on Jan. 19, 2001, entitled "A New Method For Delivering In-Vehicle Entertainment Services"; Ser. No. 60/268,482 filed on Feb. 12, 2001, entitled "Portable Handheld Devices To Receive Digital Over The Air Broadcasts"; Ser. No. 60/271,578 filed on Feb. 22, 2001, entitled "A New Method And System For Delivering Mobile Direct To Home Entertainment Services", and Ser. No. 60/272,741 filed on Mar. 1, 2001, entitled "A New Method And System For Delivering Entertainment To Portable Devices". The present application is also related to U.S. patent application entitled; "Digital Over-The-Air Communication System For Use With Analog Terrestrial Broadcasting System" Ser. No. 09/844,976; "Digital Over-The-A-Air Communication System For Use With Digital Terrestrial Broadcasting System" Ser. No. 09/844,923; "Portable Device For Use With Digital Over-The Air Communication System For Use With Terrestrial Broadcasting System" Ser. No. 09/844,932; "Communication System With Secondary Channel Rebroadcasting Within A Local Area Network" Ser. No. 09/844,919 filed simultaneously herewith and incorporated by reference herein.

TECHNICAL FIELD

The present invention relates generally to broadcasting digital information, and more specifically, to distributing electronic content using a wireless local network.

BACKGROUND ART

Hughes Electronics Corporation provides digital direct broadcast systems such as DIRECTV® and DIRECPC™ that broadcast via satellite, television programs and information or computer applications, respectively. DIRECTV® broadcasts television programming in a similar fashion to that of terrestrial television. DIRECPC™ subscribers place requests that are queued up and broadcast, to the subscriber's computer. DIRECPC™ services on-demand requests. DIRECTV® and DIRECPC™ incorporate encryption in addressing for applications such as on-demand requests. These systems provide access control where users make selection decisions in advance of the content being broadcast. The DIRECTV® system is stationary in that the television is hardwired to the antenna device.

Mobile devices such as cellular phones and personal digital assistants are increasing their presence in the marketplace. The functionality of such devices is increasing to such applications as the Internet. However, such devices have heretofore been limited to Internet applications.

Satellite connectivity directly to mobile devices has typically been expensive due to the size and complexity of antennas desired. Therefore, it was previously assumed that no economical method for delivering cable-like channels to mobile devices was practical. Further, such connectivity may be restricted or eliminated entirely within a building.

It would therefore be desirable to provide cable-like TV channels to mobile devices in a reliable and cost effective manner.

SUMMARY OF THE INVENTION

It is therefore one object of the present invention to provide a system that enables the portability of electronic content such as cable-like television programming.

In one aspect of the invention, a system of distributing electronic content has a network operations center generating a broadcast signal having digital electronic content. A communication backbone is coupled to the network operations center. A base station receives the broadcast signal from the backbone. The base station receives the broadcast signal and forms a wireless local area network. The base station rebroadcasts at least a portion of the broadcast signal as a rebroadcast signal using the wireless local network. A user appliance is positioned with said local area network and receives the rebroadcast signal.

In a further aspect of the invention, a method of distributing electronic content comprising the steps of:
  broadcasting a television signal as a electronic content;
  receiving the electronic content;
  digitally compressing the electronic content into a compressed signal; and
  rebroadcasting the compressed signal using a wireless local area network.

One advantage of the invention is that the system may be used by multiple users within the local area network. Also, the system may also be extended beyond residential use into commercial use such as within commercial buildings and mass transit.

Other objects and features of the present invention will become apparent when viewed in light of the detailed description of the preferred embodiment when taken in conjunction with the attached drawings and appended claims.

BEST MODES FOR CARRYING OUT THE INVENTION

Figure 1:
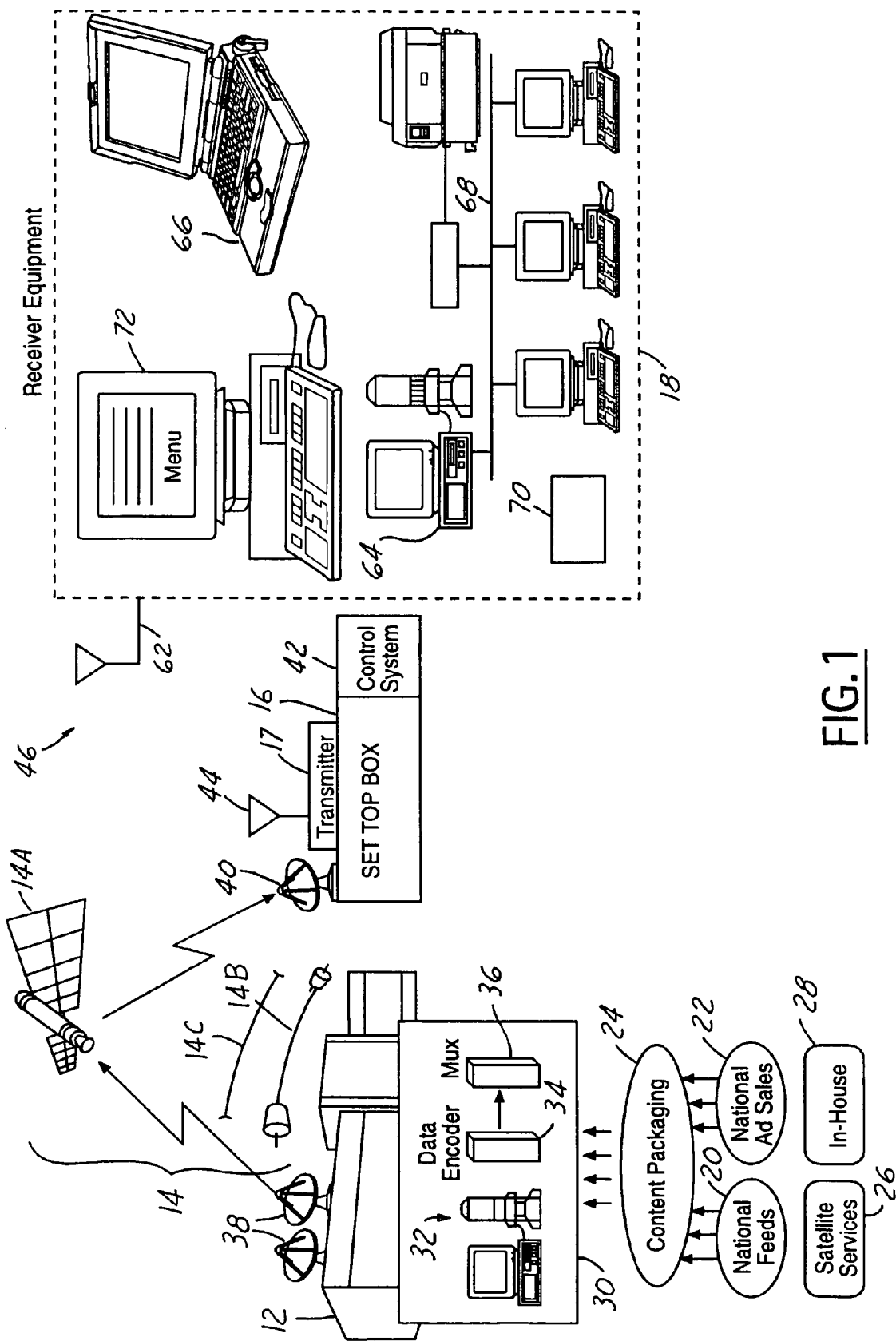
FIG. 1 is a diagrammatic view of the system architecture of a system according to the present invention.

In the following figures the same reference numerals will be used to identify the same components in the various views.

As described in this application, "electronic content" is meant to encompass various types of digital information including the distribution of music, videos, movies, music videos, games, advertising and promotional materials associated with the content. "Electronic content" may also include cable-type television programming that includes wide variety of multi-channel content.

Referring now to FIG. 1, electronic content distribution system 10 is illustrated. Electronic distribution system 10 generally has a network operations center (NOC) 12, a communication backbone 14 in communication with NOC 12, and a base station 16 that acts as a redistribution device transmits at least a portion of the received electrical content to user appliances or devices 18 over the air.

The communication backbone 14 is a way or infrastructural device in which to move data to base station 16. Communication backbone 14 may include a high altitude distribution device 14A such as a satellite or stratospheric platform, cable television cable 14B, fiber optics 14C, over the air digital broadcasting or analog broadcasting. Base station 16 is a rebroadcasting device such as a set top box that forms a wireless local area network with the user appliances 18. The set top box may be a version of the integrated receiver decoder currently available for the DIRECTV® system modified to provide wireless redistribution through transmitter 17.

The network operations center 12 is coupled to national feeds 20 and national ad sales 22 through content packaging 24. National feeds 20 may, for example, be national "cable" type services channels or satellite service such as DIRECPC™ or DIRECTV®. The national ad sales 22 may be derived in-house 28 or as will be further described below may be obtained from various promotional ad agencies. A content packaging block 24 is coupled to national feeds 20 and national ad sales 22. The content packaging 24 functions to couple national feeds 20 with national ad sales 22.

The network operations center 12 has a control system that includes various computers 32, a data encoder 34, and a multiplexer 36 that are coupled to antennas 38 that uplink electronic content to backbone 14. Of course, antennas 38 may be eliminated if backbone 14 is a cable or optical system. The control system 30 operates in a manner known to those skilled in the art. The network operations center 12 may or may not compress the electronic content before distribution through backbone 14.

Base station 16 has an antenna 40 that receives signals from backbone 14. Of course, the antenna 40 may be eliminated for another type of connection in fiber or cable backbones. Base station 16 has a control system 42 that comprises a decompression software (when the signals from NOC12 are compressed), conditional access and compression software as will be further described below. Control system 42 redistributes the received electronic content in a compressed format from transmitter 17 through antenna 44 and ultimately to the user appliance 18.

User appliance 18 is coupled to an antenna 62 used for receiving over-the-air broadcast signals from antenna 44. User appliance 18 may comprise a variety of devices such as a personal computer 64, a laptop computer 66, a network 68 or a hand-held device 70. Each of the devices is preferably coupled to an antenna 62 for receiving over-the-air signals. Each device may have the antenna 62 coupled therein or may be connected to a separate antenna such as that of an automotive vehicle. Hand-held device 70 may comprise a variety of devices such as a digital media receiver, a personal digital assistant, or other type of hand-held device. Preferably, each user device 18 has a menu 72 or other selection apparatus such as buttons or switches for selecting electronic content broadcast by base station 16. Menu 72 may provide information to the user as to the current electronic content being broadcast or may provide an interface to the electronic content stored within the user device.

Figure 2:
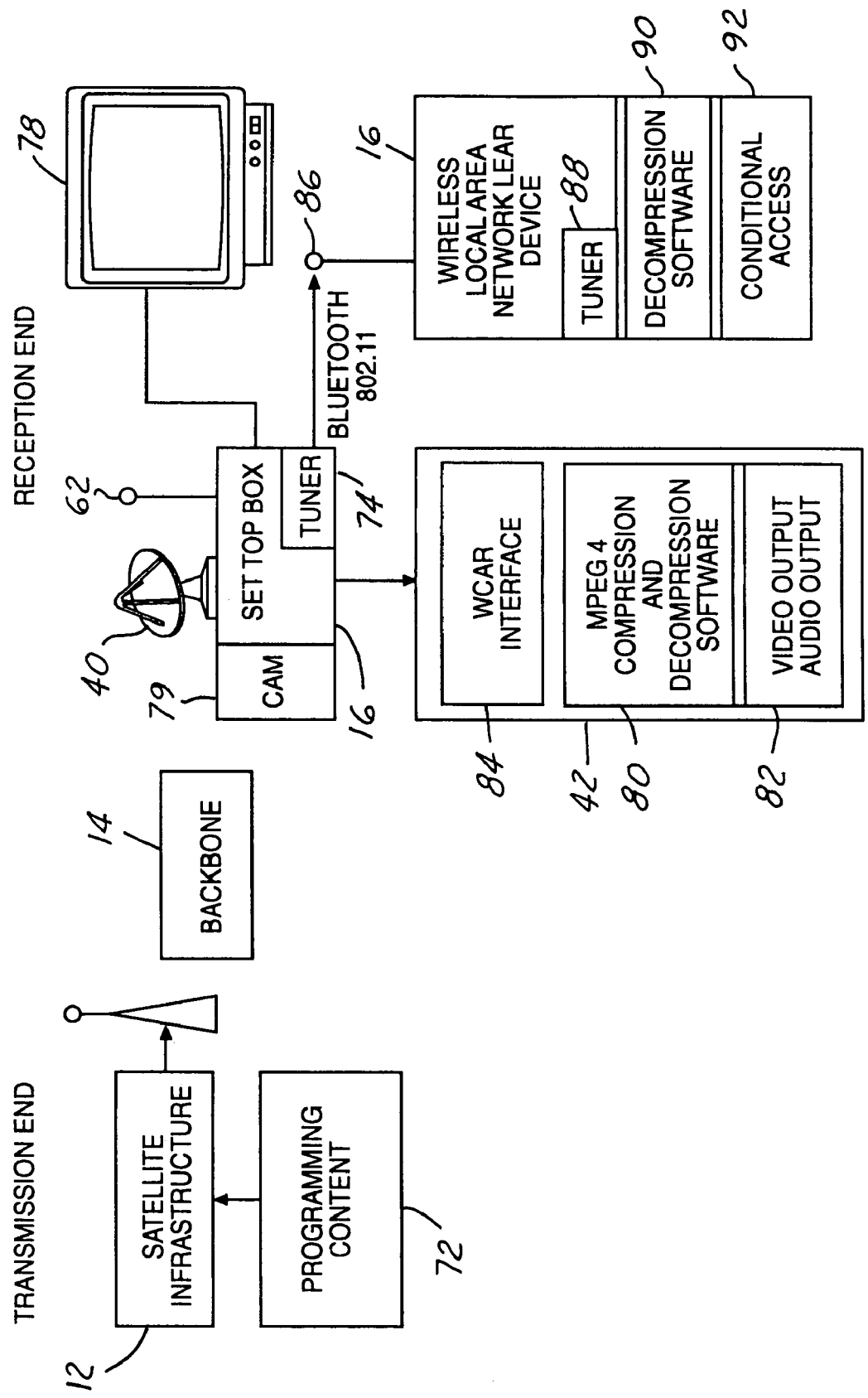
FIG. 2 is a more detailed block diagrammatic view of the system of FIG. 1.

Referring now to FIG. 2, a block diagram of a broadcast system 10 illustrating a more detailed control system 42 is illustrated. FIG. 2 uses the same reference numerals for the same components as FIG. 1. That is, electronic content 72 such as video programming is provided to a network operation center 12 through the various methods described above. Backbone 14 distributes the electronic content to the base station 16.

The set top box or base station 16 includes antenna 40 for receiving the electronic content signals described above. A tuner 74 may also be included therein for tuning various, channels received through the electronic content signal. Tuner 74 may include various numbers of individual tuners for the use of multiple users. The multiple users may include directly connected users such as a television 78 or mobile user devices 18. Conditional access software 79 may also be provided at redistribution device 40 to allow only authorized users access to the broadcast electronic content signals.

The received electronic content signal is compressed in compression software 80. Compression software 80 may include various types of digital compression including MPEG 4 compression software. Video display and audio output 82 thus receives the compressed electronic content which is then coupled to a wireless local area network interface 84.

Wireless local area network interface 84 uses an antenna 62 to redistribute the video display and audio output 82 to the user devices 18 through the antenna 86 on user device 16. Wireless local area network interface 84 preferably transmits using standard wireless technology such as Bluetooth or the 802.11 type interface a predetermined distance from base station 16. Preferably, the rebroadcast signal has less digital video content which is more suitable for retransmission to mobile devices. Typically, mobile devices do not include the processing power of high level devices such as set top boxes. Because mobile devices are smaller, the amount of content and thus the corresponding digital bits may be reduced without losing a high quality effect. The base unit 16 may be used to rebroadcast all or a portion of the digital content.

User device 18 preferably includes a tuner 88 for selecting the desired rebroadcast signal (if more than one is rebroadcast) and digital decompression software 90 that decompresses the rebroadcast signal. Conditional access software 92 may also be provided at user device 16 to allow only authorized users access to the rebroadcast signals. Such software may comprise a number of types of devices or code including password or digital key enablement.

In operation, the digital electronic content is coupled to the backbone 14. The digital electronic content is received at the base station 16. A compressed signal is formed from the electronic content. The base station 16 forms an over-the-air rebroadcast signal that is rebroadcast to the user devices 18 where it is received, displayed, or heard. Preferably, a base station 16 such as a set top box for the DIRECTV® system is modified to include the wireless local area network system described above. Such a system will provide an additional service for DIRECTV® users who require portability.

Various uses for such a system will be evident to those skilled in the art. One use envisioned for such a device is for residential use so that the electronic content may be enjoyed by watching television 78 while users throughout the house and nearby surroundings may enjoy the rebroadcast electronic content. Other uses include public buildings and public transportation. A base station 16 may be employed on the building or public transportation to receive the electronic content and rebroadcast the electronic content to the mobile wireless devices located within the local area network of the base station 16. Examples of suitable public places include airports, shopping malls, arenas, subways, trains, buses and the like.

While particular embodiments of the invention have been shown and described, numerous variations alternate embodiments will occur to those skilled in the art. Accordingly, it is intended that the invention be limited only in terms of the appended claims.

What is claimed is:

1. A system of distributing electronic content comprising:
   a network operations center generating a broadcast signal having digital electronic content;
   a communication backbone coupled to said network operations center;
   a base station receiving said broadcast signal from said backbone and forming a wireless local area network, said base station over-the-air rebroadcasting at least a portion of said broadcast signal as a rebroadcast signal using said wireless local area network; and
   a user appliance positioned with said wireless local area network and receiving said rebroadcast signal said user appliance having conditional access software therein, said conditional access software allowing the user appliance to access the rebroadcast signal.

2. A system as recited in claim 1 further comprising a television coupled to said base station, said television receiving at least a portion of said rebroadcast television signal.

3. A system as recited in claim 1 wherein said base station forms said rebroadcast signal from said digital electronic content.

4. A system as recited in claim 1 wherein said electronic content comprises digital audio signals.

5. A system as recited in claim 1 wherein said electronic content comprises video.

6. A system as recited in claim 1 wherein said backbone comprises a high altitude device, cable or fiber optic cable.

7. A system as recited in claim 6 wherein said high altitude device comprises a satellite.

8. A system as recited in claim 6 wherein said high altitude device comprises a stratospheric platform.

9. A system as recited in claim 1 wherein said base station comprises an integrated receiver decoder.

10. A system as recited in claim 1 wherein said rebroadcast signal is compressed at the base station into a compressed signal.

11. A system as recited in claim 1 wherein said backbone comprises a cable network.

12. A system as recited in claim 1 wherein said backbone comprises a fiber optic network.

13. A method of distributing electronic content comprising the steps of:
    coupling electronic content to a redistribution device;
    receiving the electronic content from the redistribution device;
    over-the-air broadcasting at least a portion of the electronic content from the redistribution device; and
    receiving the over-the-air electronic content trough a user appliance having conditional access software therein, said conditional access software allowing the user appliance to access the rebroadcast signal.

14. A method as recited in claim 13 wherein the step of over-the-air broadcasting comprises over-the-air broadcasting from a base station.

15. A method as recited in claim 13 wherein the step of over-the-air broadcasting comprises forming a local area network with the user appliance.

16. A method of distributing electronic content comprising the steps of:
    broadcasting a television signal as electronic content;
    receiving the electronic content at a base station;
    digitally compressing the electronic content into a compressed signal at the base station;
    over-the-air rebroadcasting the compressed signal using a wireless local area network;
    allowing conditional access at a user device through conditional access software in the user device.

17. A method as recited in claim 16 further comprising the steps of receiving the compressed signal at a user appliance.

18. A method as recited in claim 16 wherein the step of receiving comprises the steps of digitally decompressing the digital video stream, and displaying the video stream.

19. A base station comprising:
    a receiving antenna for receiving electronic content;
    compression software for compressing the electronic content into a compressed signal within the base station;
    conditional access software accessing the electronic content;
    a transmitting local area network antenna; and
    a wireless local area network interface coupled to the transmitting local area network antenna and wirelessly broadcasting the compressed signal through the local area network antenna as a compressed wireless rebroadcast signal.

* * * * *